(12) United States Patent  (10) Patent No.: US 8,373,769 B2
Hikosaka  (45) Date of Patent: Feb. 12, 2013

(54) IMAGING APPARATUS, IMAGING PROCESSING METHOD AND RECORDING MEDIUM

(75) Inventor: Naotaka Hikosaka, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 271 days.

(21) Appl. No.: 12/945,986

(22) Filed: Nov. 15, 2010

(65) Prior Publication Data

US 2011/0115898 A1  May 19, 2011

(30) Foreign Application Priority Data

Nov. 17, 2009 (JP) .................................. 2009-261782

(51) Int. Cl.
*H04N 9/73* (2006.01)
*G06K 9/00* (2006.01)

(52) U.S. Cl. ..................................... 348/223.1; 382/167

(58) Field of Classification Search .................. 348/242, 348/68, 222.1, 223.1, 241, 231.99, 208.4, 348/240.99, 229.1, 296, 239, 353, 371, 273, 348/280, 362, 225.1, 226.1, 227.1, 228.1, 348/345, 358, 96, 107, 110, 373, 375; 382/167, 382/195, 260, 251, 255, 162, 262, 164, 264, 382/275, 165, 166, 110
See application file for complete search history.

(56) References Cited

U.S. PATENT DOCUMENTS 8,115,822 B2   2/2012  Mimura et al.

FOREIGN PATENT DOCUMENTS

| JP | 2005-286847 A | 10/2005 |
| JP | 2006-186688 A | 7/2006 |
| JP | 2008-236032 A | 10/2008 |
| JP | 2009-159469 A | 7/2009 |
| JP | 2009-194437 A | 8/2009 |

OTHER PUBLICATIONS

Japanese Office Action dated Sep. 6, 2011 (and English translation thereof) in counterpart Japanese Application No. 2009-261782.

*Primary Examiner* — Behrooz Senfi
(74) *Attorney, Agent, or Firm* — Holtz, Holtz, Goodman & Chick PC (57) ABSTRACT

An imaging apparatus, including, an imaging section, a gain adjustment section to adjust gain values of an R component or a B component, an information obtaining section to obtain information about a first photographing environment of the image after an adjustment, a first judgment section to judge whether the first photographing environment in the obtained information and a second photographing environment to which the gain adjustment section is to adjust the gain values of the R component or the B component, are different from each other, a gain re-adjustment section to re-adjust at least one of the gain values of the R component and the B component to be suppressed when judged that the first photographing environment and the second photographing environment are different from each other, and an image recording section to record an image obtained by performing a color adjustment by using a re-adjusted gain value.

6 Claims, 7 Drawing Sheets

IMAGING APPARATUS, IMAGING PROCESSING METHOD AND RECORDING MEDIUM

BACKGROUND OF THE INVENTION

1. Field of the Invention

This invention relates to an imaging apparatus, an imaging processing method and a recording medium.

2. Description of Related Art

Japanese Patent Application Laid-Open Publication No. 2009-159469 discloses a technique of color representation on an image taken underwater. Generally, when an image is taken underwater, an image in which a B (Blue) component of RGB (Red, Green and Blue) components is strongly emphasized is generated if the image is taken without performing a correction setting beforehand. In order to prevent such a problem, in the technique described in the above cited document, an R component is made rather strong by performing a correction close to the correction in "overcast" in the correction of a white balance, and thereby, an image, in which colors are naturally reproduced, is generated.

However, if an image is taken in an environment other than underwater while the correction of the image, as mentioned above, is being performed, an image with natural color shades is not generated except in the case of taking an image underwater. Therefore, a user needed to reset a photographing condition.

SUMMARY OF THE INVENTION

Therefore, a main object of the present invention is to generate an image with natural color shades, even if a correction setting has been made corresponding to a special photographing environment and the image is taken under a photographing environment other than the special photographing environment.

According to a first aspect of the present invention, there is provided an imaging apparatus, including, an imaging section, a gain adjustment section to adjust a gain value of an R component or a gain value of a B component so that an average value of R components and an average value of B components match an average value of G components, respectively, among color components of a pixel in a gray region included in a color image imaged by the imaging section, an information obtaining section to obtain information about a first photographing environment of the image after an adjustment by the gain adjustment section, a first judgment section to judge whether the first photographing environment in the information obtained by the information obtaining section and a second photographing environment to which the gain adjustment section is to adjust the gain value of the R component or the gain value of the B component, are different from each other, a gain re-adjustment section to re-adjust at least one of the gain value of the R component and the gain value of the B component, each having been adjusted by the gain adjustment section, to be suppressed, when the first judgment section judges that the first photographing environment and the second photographing environment are different from each other, and an image recording section to record an image obtained by performing a color adjustment by using a gain value re-adjusted by the gain re-adjustment section.

According to a second aspect of the present invention, there is provided an imaging processing method using an imaging apparatus including an imaging section, including, the steps of, adjusting a gain value of an R component or a gain value of a B component so that an average value of R components and an average value of B components match an average value of G components, respectively, among color components of a pixel in a gray region included in a color image imaged by the imaging section, obtaining information about a first photographing environment of the image after an adjustment of the gain value of the R component or the gain value of the B component, judging whether the first photographing environment in the obtained information and a second photographing environment to which the gain value of the R component or the gain value of the B component is to be adjusted, are different from each other, re-adjusting at least one of the gain value of the R component and the gain value of the B component, each having been adjusted, to be suppressed, when judged that the first photographing environment and the second photographing environment are different from each other, and recording an image obtained by performing a color adjustment by using a re-adjusted gain value.

According to a third aspect of the present invention, there is provided a recording medium readable by a computer of an imaging apparatus including an imaging section, recording a program to make the computer function as, a gain adjustment section to adjust a gain value of an R component or a gain value of a B component so that an average value of R components and an average value of B components match an average value of G components, respectively, among color components of a pixel in a gray region included in a color image imaged by the imaging section, an information obtaining section to obtain information about a first photographing environment of the image after an adjustment by the gain adjustment section, a first judgment section to judge whether the first photographing environment in the information obtained by the information obtaining section and a second photographing environment to which the gain adjustment section is to adjust the gain value of the R component or the gain value of the B component, are different from each other, a gain re-adjustment section to re-adjust at least one of the gain value of the R component and the gain value of the B component, each having been adjusted by the gain adjustment section, to be suppressed, when the first judgment section judges that the first photographing environment and the second photographing environment are different from each other, and an image recording section to record an image obtained by performing a color adjustment by using a gain value re-adjusted by the gain re-adjustment section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, concrete aspects of the present invention will be described with reference to the accompanying drawings. The scope of the invention is not, however, limited to the shown examples.

Figure 1:
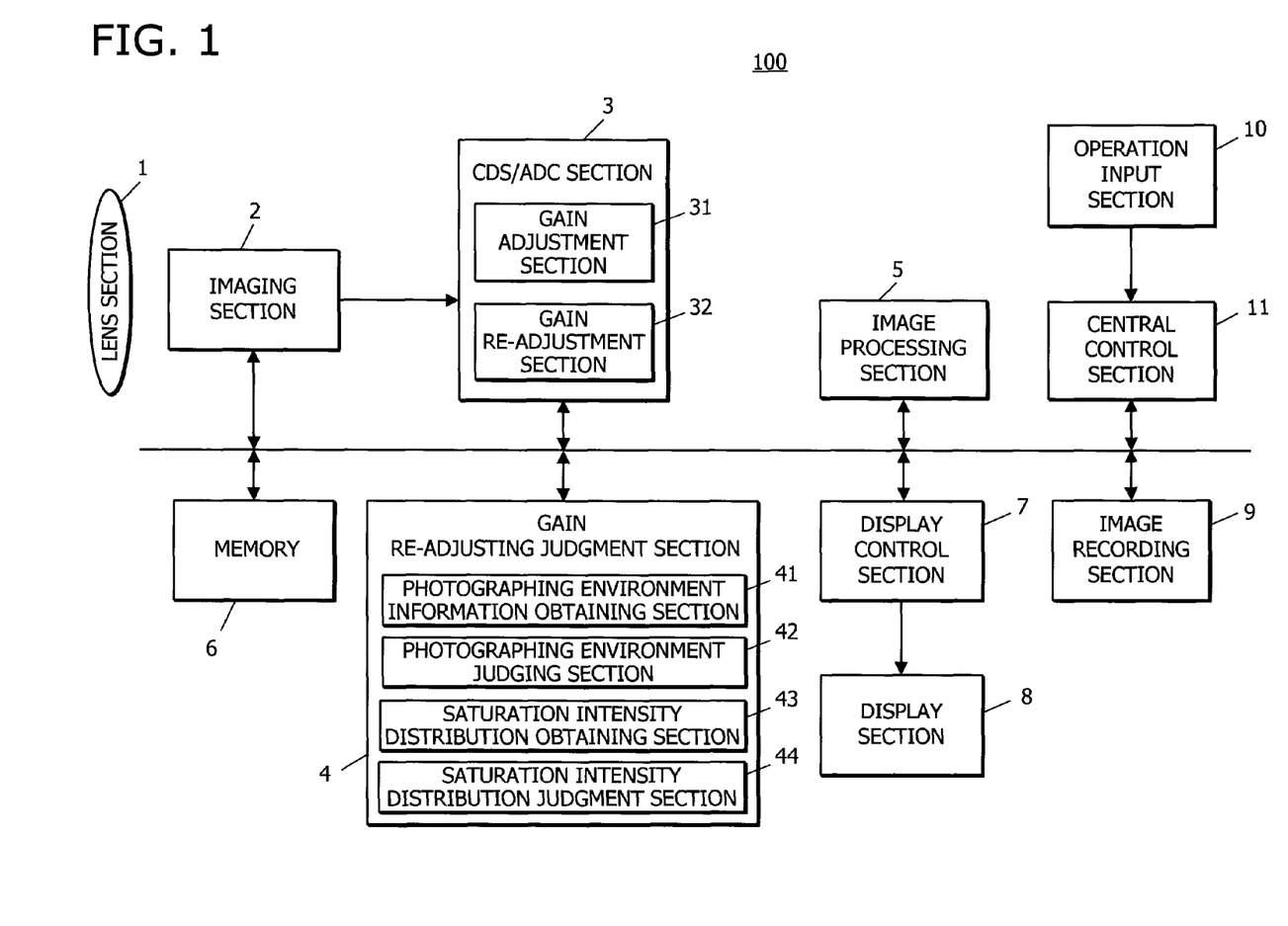
FIG. 1 is a block diagram showing a schematic configuration of an imaging apparatus of an embodiment to which the present invention is applied.

FIG. 1 is a block diagram showing a schematic configuration of an imaging apparatus 100 of an embodiment to which the present invention is applied.

In the imaging apparatus 100 in the present embodiment, after a gain value of an R component and/or a gain value of a B component of an image is adjusted, it is judged whether a photographing environment of the image (a first photographing environment) and a photographing environment to which a gain value is to be adjusted (a second photographing environment), are different from each other. As the result of the judgment, if it is judged that the first photographing environment and the second photographing environment are different from each other, the gain values of the R component and/or the B component, which have been adjusted, are re-adjusted so that the gain values may be suppressed, and then, the image obtained by performing the color adjustment by using the re-adjusted gain values is recorded.

Concretely, as shown in FIG. 1, the imaging apparatus 100 includes a lens section 1, an imaging section 2, a CDS/ADC section 3, a gain re-adjusting judgment section 4, an image processing section 5, a memory 6, a display control section 7, a display section 8, an image recording section 9, an operation input section 10 and a central control section 11.

The lens section 1 includes, for example, a zoom lens group and a focus lens group. The position of the lens section 1 in the optical axis direction can be adjusted by a lens drive mechanism (for example, a motor and the like).

The imaging section 2 includes an electronic imaging section which is composed of an image sensor and the like such as CCD (Charge Coupled Device) and CMOS (Complementary Metal-oxide Semiconductor) and the like. Further, the imaging section 2 converts an optical image, which has passed through various lenses of the lens section 1 and an aperture (not shown), into a two-dimensional image signal (RGB image data) by the electronic imaging section and outputs the converted image signal to the CDS/ADC section 3.

In addition, the lens section 1 and the imaging section 2 constitute an imaging section.

To the CDS/ADC section 3, an image signal, which is composed of RGB color components, according to the optical image of the subject output from the imaging section 2, is input. The CDS/ADC section 3 converts the input image signal into the image data which is composed of digital YUV (luminance color difference) information (hereinafter referred to as YUV image data) or the image data corresponding to HSV color space (hereinafter referred to as HSV image data), and outputs the converted image data to the central control section 11, if needed.

Further, the CDS/ADC section 3 includes a gain adjustment section 31, a gain re-adjustment section 32 (discussed below in detail) and the like. In addition, the CDS/ADC section 3 adjusts a white balance of an image by amplifying RGB image data based on gain values of each of RGB color components adjusted by the gain adjustment section 31 or the gain re-adjustment section 32.

The gain adjustment section 31 adjusts the gain values of the RGB components of an image input to the CDS/ADC section 3. Concretely, the gain adjustment section 31 generates a reduced image (for example, an image of Video Graphics Array (VGA) size) by reducing the YUV image data, converted by the CDS/ADC section 3, at a predetermined ratio both in a horizontal (x-axis) direction and in a vertical (y-axis) direction. When an imaging mode is set to an underwater photographing mode, the gain adjustment section 31 converts the YUV image data of the reduced image into HSV image data, and then, creates histograms of saturation S and brightness V, respectively, to calculate a gray pixel specifying condition from the histograms of the saturation S and the brightness V. Then, the gain adjustment section 31 specifies pixels of a gray region included in the reduced image based on the calculated gray pixel specifying condition. Further, the gain adjustment section 31 adjusts a gain value of the R component and/or a gain value of the B component so that the average value of the R components and the average value of the B components almost match the average value of the G components, respectively, among the RGB color components of the pixels in the gray region. In addition, the average value of each of the RGB components means an average value of each of the parameter values indicating color intensity.

In addition, the gain adjustment section 31 constitutes a gain adjustment section to adjust a gain value of an R component and/or a gain value of a B component so that an average value of R components and an average value of the B components match an average value of the G components, respectively, among color components of pixels in a gray region included in a color image imaged by the imaging section 2.

The gain re-adjustment section 32 re-adjusts the gain value of the R component and/or the gain value of the B component, each having been adjusted by the gain adjustment section 31, to be suppressed. Concretely, the gain re-adjustment section 32 re-adjusts the gain value of the R component and/or the gain value of the B component to be suppressed, when the gain re-adjusting judgment section 4 (discussed below in detail) judges that re-adjustment of the gain value of the R component and/or the gain value of the B component is necessary.

That is to say, when a photographing environment judging section 42 (discussed below) of the gain re-adjusting judgment section 4 judges that an actual surrounding photographing environment (the first photographing environment) and a photographing environment to which the gain adjustment section 31 is to adjust a gain value (the second photographing environment) are different from each other, the gain re-adjustment section 32 performs a first suppression processing where the gain value of the R component and/or the gain value of the B component, each having been adjusted by the gain adjustment section 31, are re-adjusted to be suppressed.

In addition, the gain re-adjustment section 32 constitutes a gain re-adjustment section to re-adjust at least one of the gain value of the R component and the gain value of the B component, each having been adjusted by the gain adjustment section 31, to be suppressed, when the gain re-adjusting judgment section 4 judges that an actual surrounding photographing environment (the first photographing environment) and a photographing environment to which the gain adjustment section 31 is to adjust a gain value (the second photographing environment) are different from each other.

Moreover, when a saturation intensity distribution judgment section 44 (discussed below) of the gain re-adjusting judgment section 4 judges that a threshold value of the gray pixels (a gray value) in the histogram (the intensity distribution) of saturation S in HSV color space of a reduced image is less than a predetermined value, the gain re-adjustment section 32 re-adjusts the gain value of the R component, having been adjusted by the gain adjustment section 31, to be more strongly suppressed than the gain value of the B component. More concretely, when the gain value of the R component, having been adjusted by the gain adjustment section 31, is more than the gain value of the B component, the saturation intensity distribution judgment section 44 judges whether the threshold value of the gray pixels in the histogram (the intensity distribution) of saturation S of the reduced image is less than the predetermined value. When the saturation intensity distribution judgment section 44 judges that the threshold value of the gray pixels is less than the predetermined value, the gain re-adjustment section 32 performs a second suppression processing where the gain value of the R component, having been adjusted by the gain adjustment section 31, is re-adjusted to be more strongly suppressed than the gain value of the B component. In addition, as regards the predetermined value, a plurality of predetermined values may be set, and a predetermined value may be selected depending on which position in a histogram the threshold value of the gray pixels occupies. In that case, a suppression amount of the gain values of an R component and/or a B component is changed according to the selected predetermined value.

The gain re-adjusting judgment section 4 includes a photographing environment information obtaining section 41, the photographing environment judging section 42, a saturation intensity distribution obtaining section 43 and the saturation intensity distribution judgment section 44.

The photographing environment information obtaining section 41, as an information obtaining section, obtains information about the photographing environment of an image after the gain adjustment section 31 adjusts the gain values of the R component and/or the B component, among the RGB color components of a reduced image. Concretely, the photographing environment information obtaining section 41 converts the YUV image data, converted by the CDS/ADC section 3, into RGB image data, and after that, obtains the histograms (luminance distributions) of each of the RGB color components of a reduced image, as the information about the photographing environment.

The photographing environment judging section 42, as a first judgment section, judges whether the first photographing environment and the second photographing environment are different from each other. Here, the first photographing environment is the photographing environment in the information obtained by the photographing environment information obtaining section 41. On the other hand, the second photographing environment is the photographing environment corresponding to the photographing mode designated by a user beforehand at the time of imaging (an underwater photographing mode, for example), i.e., the photographing environment to which the gain adjustment section 31 is to adjust a gain value.

Concretely, the photographing environment judging section 42 judges whether the actual surrounding photographing environment, and the photographing environment to which the gain adjustment section 31 is to adjust a gain value, are different from each other, according to whether at least the histograms of the R component and the B component, among the histograms (the luminance distributions) of each of the RGB color components obtained by the photographing environment information obtaining section 41, have widths equal to or more than a predetermined value, respectively. When, the histograms of the R component and the B component have widths equal to or more than the predetermined value, respectively, the photographing environment judging section 42 judges that the actual surrounding photographing environment and the photographing environment to which the gain adjustment section 31 is to adjust a gain value are different from each other.

The saturation intensity distribution obtaining section 43 obtains a histogram of saturation S in HSV color space of a reduced image generated by the gain adjustment section 31. In addition, the saturation intensity distribution obtaining section 43 constitutes an intensity distribution obtaining section to obtain a histogram (an intensity distribution) of saturation S of a reduced image (an imaged image).

The saturation intensity distribution judgment section 44, as a second judgment section, judges whether the threshold value of the gray pixels in the histogram (the intensity distribution) of saturation S obtained by the saturation intensity distribution obtaining section 43 is less than a predetermined value. Concretely, when judged that the gain value of the R component adjusted by the gain adjustment section 31 is more than the gain value of the B component, the saturation intensity distribution judgment section 44 identifies a threshold value of gray pixels based on the histogram (the intensity distribution) of saturation S of a reduced image. Concretely, the saturation intensity distribution judgment section 44 identifies the maximum pixel value in the gray region including the pixels within a predetermined range (a predetermined proportion of the total number of the pixels in a reduced image) from the pixel having the minimum pixel value, as a threshold value. And then, the saturation intensity distribution judgment section 44 judges whether the threshold value of the gray pixels is less than the predetermined value.

The image processing section 5 receives the image data output from the central control section 11, performs various image processing and compression and the like to the image data, and file the image data, at the time of recording the image data output from the CDS/ADC section 3. Then, the image processing section 5 transfers the filed image data to the image recording section 9.

The memory 6 is composed of, for example, a dynamic random-access memory (DRAM) and the like. The memory 6 temporarily stores the data etc. to be processed by the image processing section 5, the central control section 11 and the like.

The display control section 7 performs the control of reading the image data to be displayed, stored in the memory 6 temporarily, and making the display section 8 display the read image data.

Concretely, the display control section 7 includes a video random access memory (VRAM), a VRAM controller, a digital video encoder, and the like (none of which are shown). Then, the digital video encoder periodically reads the luminance signal Y and the chrominance difference signals Cb and Cr, read from the memory 6 and stored in the VRAM, from the VRAM through the VRAM controller, and generates a video signal on the basis of these pieces of data to output the generated video signal to the display section 8 under the control of the central control section 11.

The display section 8 is, for example, a liquid crystal display apparatus. The display section 8 displays an image and the like imaged by the imaging section 2 on the display screen thereof on the basis of the video signal from the display control section 7.

Concretely, the display section 8 displays a live view image while sequentially updating a plurality of image frames produced by the imaging of a subject by the imaging section 2, at a predetermined frame rate, in a still image photographing mode and a moving image photographing mode.

The image recording section 9 is composed of, for example, a nonvolatile memory and the like. The image recording section 9 records still image data coded by a coding section (not shown) of the image processing section 5 in a predetermined compression format, and moving image data composed of a plurality of image frames.

Moreover, the image recording section 9 records an image adjusted by the CDS/ADC section 3 based on the gain values of each of the RGB color components adjusted by the gain adjustment section 31 or the gain re-adjustment section 32. In addition, the image recording section 9 constitutes an image recording section to record an image which has been imaged by the imaging section 2, and obtained by performing a color adjustment by using the gain value re-adjusted by the gain re-adjustment section 32.

The operation input section 10 is a section for performing a predetermined operation of the imaging apparatus 100. Concretely, the operation input section 10 includes a shutter button pertaining to a photographing instruction of a subject, a selection determining button pertaining to a selection and instruction of an imaging mode and a function etc., a zooming button pertaining to an adjustment and an instruction of a zoom amount, and the like (none of which are shown). The operation input section 10 outputs a predetermined operation signal according to an operation of these buttons to the central control section 11.

The central control section 11 controls each section of the imaging apparatus 100. Concretely, the central control section 11 includes a central processing unit (CPU) (not shown). The central control section 11 performs various control operations in conformity with various processing programs (not shown) for the imaging apparatus 100.

Next, the image correction processing at the time of the imaging of a subject by the imaging apparatus 100 will be described with reference to FIG. 2 to FIG. 7.

Figure 2:
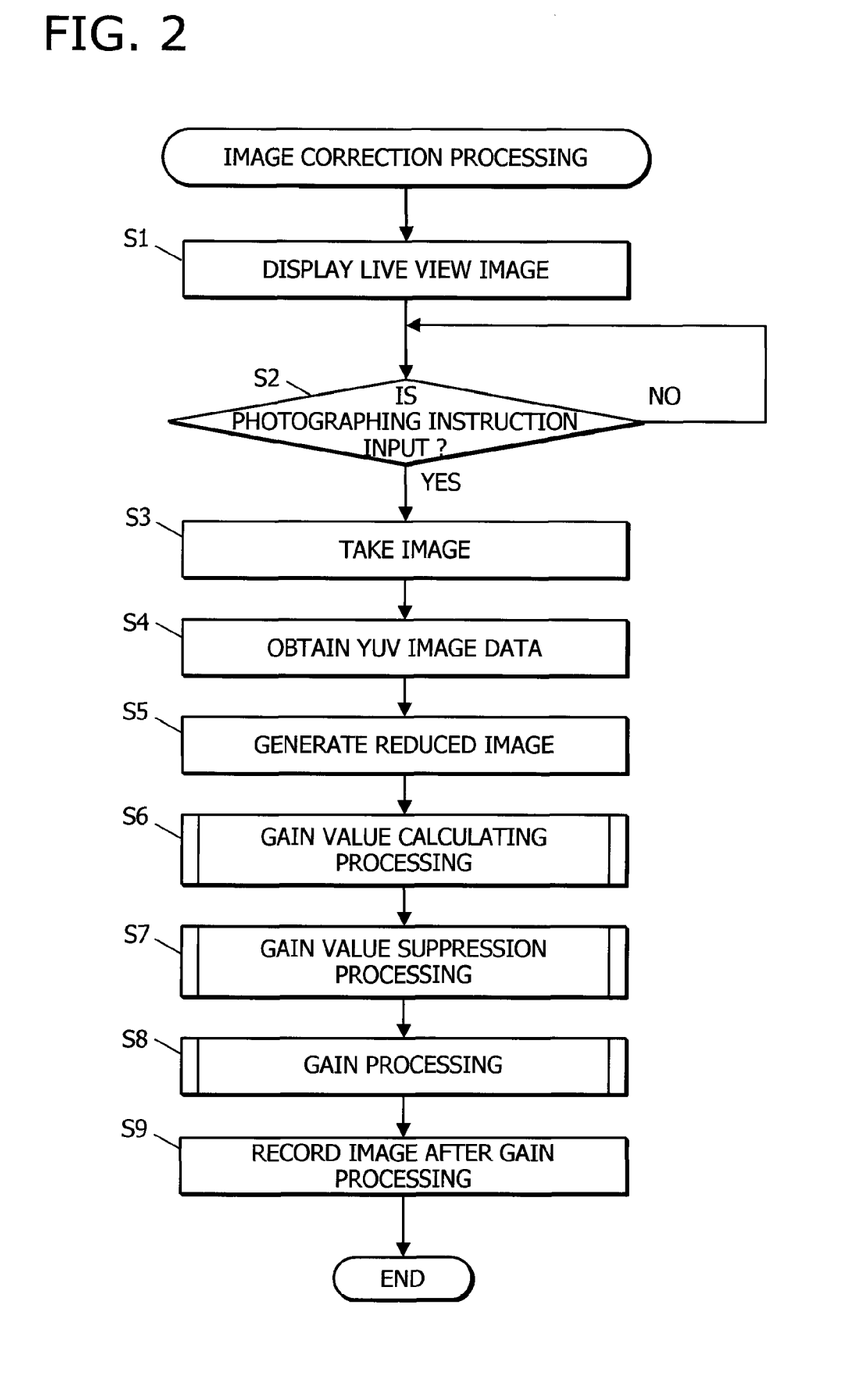
FIG. 2 is a flow chart showing an example of an operation in an image correction processing by the imaging apparatus of FIG. 1.

FIG. 2 is a flow chart showing an example of an operation in the image correction processing.

The image correction processing is a processing which is performed when "the underwater photographing mode", which enables a proper photographing underwater, is selected and instructed among a plurality of modes displayed on a menu screen, on the basis of the predetermined operation of the operation input section 10 by a user.

As shown in FIG. 2, the display control section 7 makes a live view image displayed on the display screen of the display section 8 on the basis of a plurality of image frames produced by the imaging of a subject by the lens section 1 and the imaging section 2 (Step S1).

Next, the central control section 11 judges whether a photographing instruction is input on the basis of the predetermined operation of the shutter button of the operation input section 10 by a user (Step S2). If the central control section 11 judges that a photographing instruction is input (Step S2: YES), the central control section 11 makes a focusing position of the focus lens group, a condition of exposure (a shutter speed and an aperture etc.) and the like, adjusted, and makes an optical image of a subject imaged by the imaging section 2 under a predetermined condition (Step S3). Then, the CDS/ADC section 3 converts the RGB image data of the optical image of the subject output from the imaging section 2 into digital YUV image data, and obtains the converted digital YUV image data (Step S4).

Next, the gain adjustment section 31 generates a reduced image (for example, an image of Video Graphics Array (VGA) size) by reducing the YUV image data, converted by the CDS/ADC section 3, at a predetermined ratio both in a horizontal (x-axis) direction and in a vertical (y-axis) direction (Step S5). In addition, the YUV image data of the generated reduced image is stored in the predetermined storage area of the memory 6.

And then, the gain adjustment section 31 performs again value calculating processing (Refer to FIG. 3, FIG. 4A and FIG. 4B; discussed below in detail) to calculate the gain values of the R component and the B component of the image, based on the YUV image data of the reduced image (Step S6).

After that, the gain re-adjustment section 32 performs a gain value suppression processing (Refer to FIG. 5, FIG. 6A and FIG. 6B; discussed below in detail) to re-adjust the gain values of the R component and/or the B component, calculated by the gain adjustment section 31, to be suppressed (Step S7).

Next, the CDS/ADC section 3 performs a gain processing to adjust a white balance of the image by applying the gain values of the R component and the B component of the reduced image after the gain value suppression processing to the RGB image data of the optical image of the subject, and by amplifying the RGB image data (Step S8). And after that, the image recording section 9 records the image after the gain processing (Step S9), and ends the image correction processing.

In addition, the gain values of the R component and the B component may be changed according to the values of the R component and the B component, respectively, of each pixel of the RGB image data. That is to say, the gain values of the R component and the B component may be calculated not in a uniform way but may be calculated in the following way. For example, when the value of the R component and the value of the B component of the pixels to be processed are less than the average value of the R components and the average value of the B components in the gray region, respectively, the gain values of the R component and the B component, which have been set, are calculated without any change. On the other hand, when the values of the R component and the B component of the pixels to be processed are equal to or more than the average values, respectively, the gain values of the R component and the B component may be changed, respectively, so as to become gradually small as the values of the R component and the B component are closer to the maximum values, respectively.

Next, the gain value calculating processing at step S6 will be described in detail with reference to FIG. 3, FIG. 4A and FIG. 4B.

Figure 3:
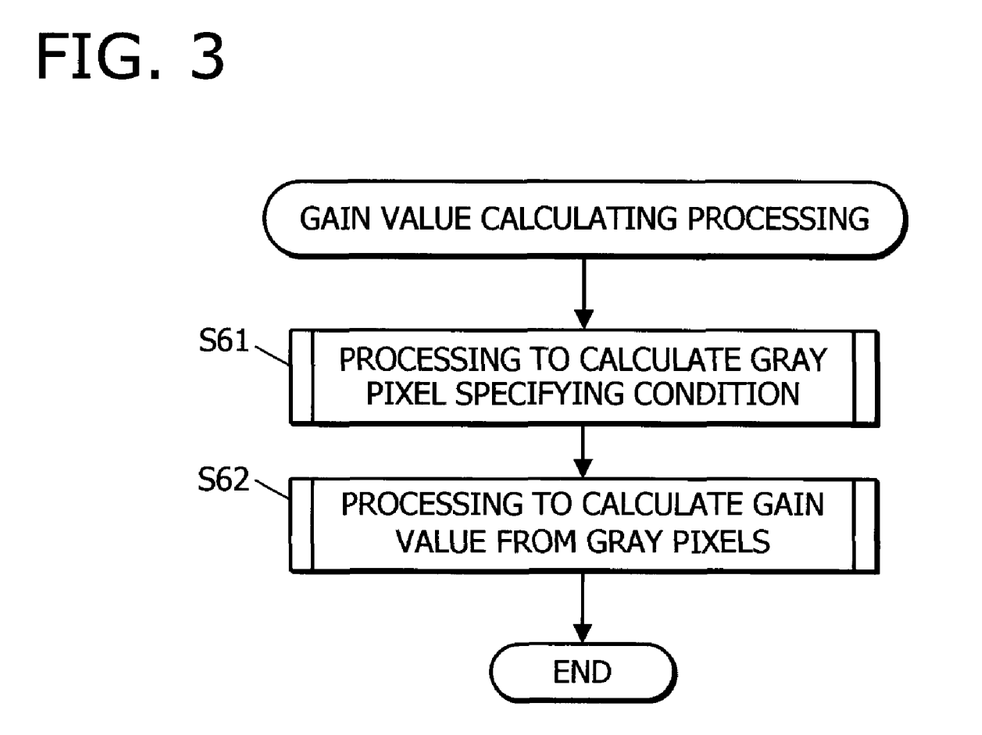
FIG. 3 is a flow chart showing an example of an operation in a gain value calculating processing in the image correction processing in FIG. 2.

FIG. 3 is a flow chart showing an example of an operation in the gain value calculating processing. FIG. 4A is a flow chart showing an example of an operation in the processing to calculate a gray pixel specifying condition performed in the gain value calculating processing. Further, FIG. 4B is a flow chart showing an example of an operation in the processing to calculate a gain value from gray pixels performed in the gain value calculating processing.

As shown in FIG. 3, in the gain value calculating processing, the processing to calculate the gray pixel specifying condition is performed to specify the gray region included in a reduced image (an imaged image) (Step S61), and after that, the processing to calculate the gain value from the pixels in the gray region, specified on the basis of the gray pixel specifying condition, is performed (Step S62).

First, the processing to calculate the gray pixel specifying condition at Step S61 will be described in detail with reference to FIG. 4A.

Figure 4A:
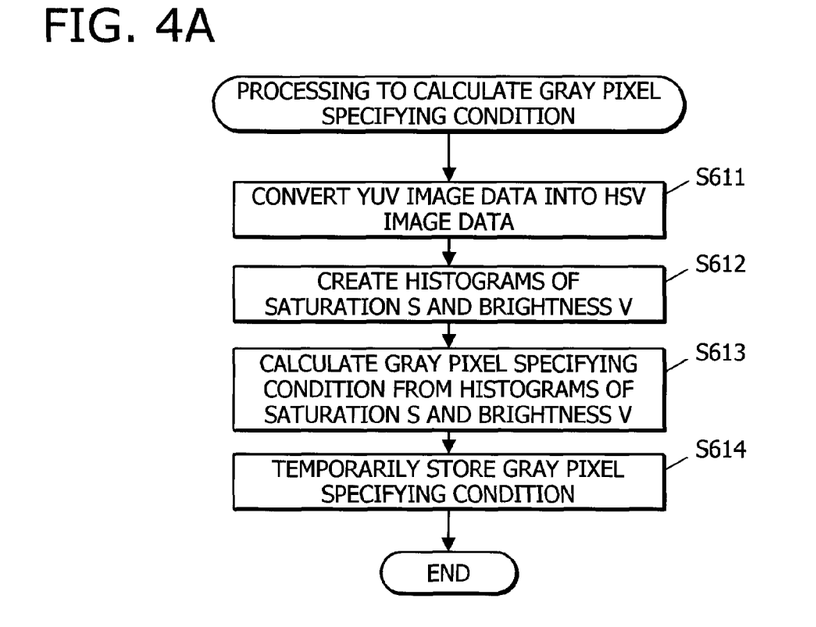
FIG. 4A is a flow chart showing an example of an operation in a processing to calculate a gray pixel specifying condition in the gain value calculating processing in FIG. 3.

As shown in FIG. 4A, the gain adjustment section 31 first converts the YUV image data of a reduced image into HSV image data (Step S611), and then, creates the histogram of saturation S (Refer to FIG. 7A) and the histogram of brightness V (Refer to FIG. 7B) (Step S612). Then, the gain adjustment section 31 calculates the gray pixel specifying condition to make the region including the pixels within a predetermined range (a predetermined proportion of the total number of the pixels in the reduced image) from the pixel having the minimum pixel value, be the candidate of the gray pixel, in the histograms of the saturation S and the brightness V, respectively (Step S613).

The gain adjustment section 31 temporarily stores the calculated gray pixel specifying condition in the memory 6 (Step S614), and then, ends the processing to calculate the gray pixel specifying condition.

Next, the processing to calculate a gain value from gray pixels at Step S62 will be described in detail with reference to FIG. 4B.

Figure 4B:
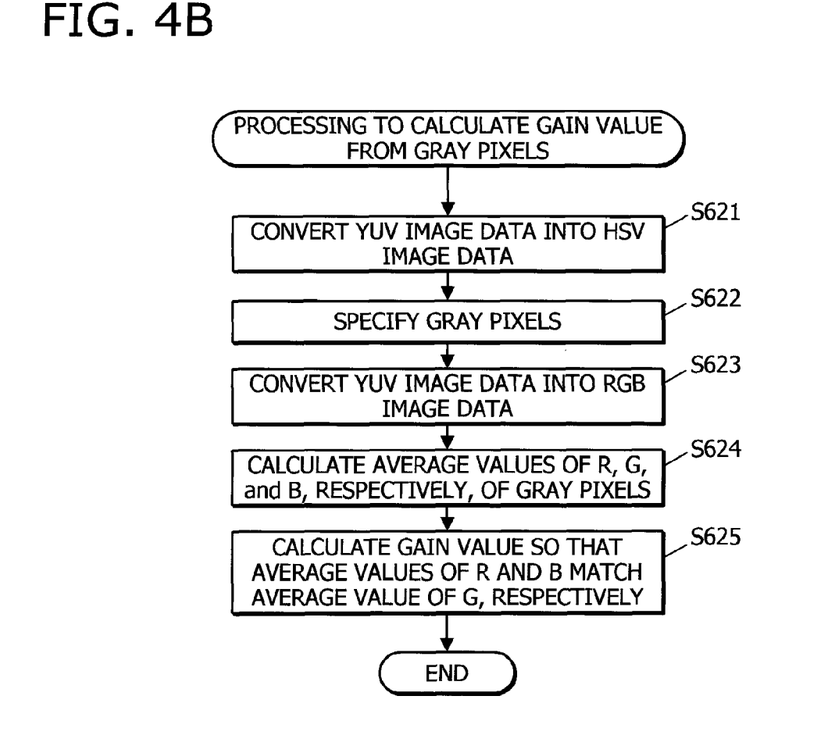
FIG. 4B is a flow chart showing an example of an operation in a processing to calculate a gain value from gray pixels in the gain value calculating processing in FIG. 3.

As shown in FIG. 4B, the gain adjustment section 31 first converts the YUV image data of a reduced image into HSV image data (Step S621).

In addition, the conversion processing from the YUV image data into the HSV image data of the reduced image at Step S621 can be omitted by storing the values of the saturation S and the brightness V of the HSV image data generated in the processing to calculate the gray pixel specifying condition at Step S611 in the predetermined storage area in the memory 6.

Next, the gain adjustment section 31 reads the gray pixel specifying condition temporarily stored in the memory 6 to obtain the gray pixel specifying condition. And after that, the gain adjustment section 31 specifies the pixels of the gray region included in the reduced image, from the HSV image data of the reduced image, based on the gray pixel specifying condition (Step S622).

Then, the gain adjustment section 31 converts the YUV image data of the reduced image into RGB image data (Step S623), and after that, calculates the average values of each of the RGB color components of the pixels of all the gray regions specified (Step S624).

Next, the gain adjustment section 31 calculates the gain value of the R component and/or the gain value of the B component so that the average value of the R components and the average value of the B components almost match the average value of the G components, respectively, in the pixels of the gray region (Step S625), and then, ends the processing to calculate the gain value from gray pixels.

Next, the gain value suppression processing at Step S7 will be described in detail with reference to FIG. 5, FIG. 6A and FIG. 6B.

Figure 5:
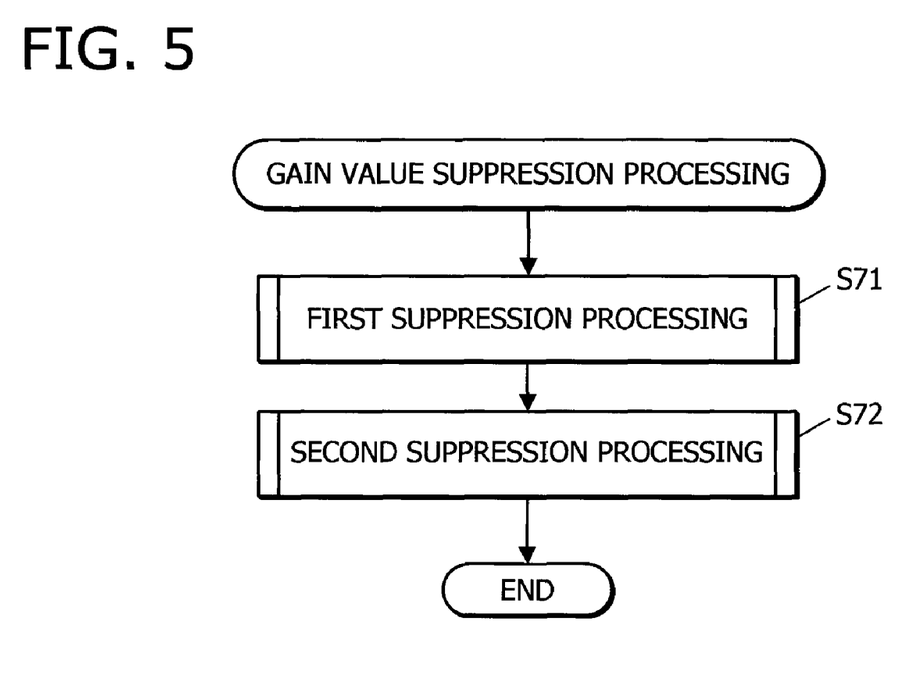
FIG. 5 is a flow chart showing an example of an operation in a gain value suppression processing in the image correction processing in FIG. 2.

FIG. 5 is a flow chart showing an example of an operation in the gain value suppression processing. FIG. 6A is a flow chart showing an example of an operation in the first suppression processing performed in the gain value suppression processing. FIG. 6B is a flow chart showing an example of an operation in the second suppression processing performed in the gain value suppression processing.

As shown in FIG. 5, in the gain value suppression processing, the first suppression processing to re-adjust the gain values of the R component and/or the B component to be suppressed is performed using the histogram widths of each of the RGB color components of the reduced image (Step S71). And after that, the second suppression processing to re-adjust the gain value of the R component to be suppressed is performed using the histogram of saturation S of the reduced image (Step S72).

First, the first suppression processing at Step S71 will be described in detail with reference to FIG. 6A.

Figure 6A:
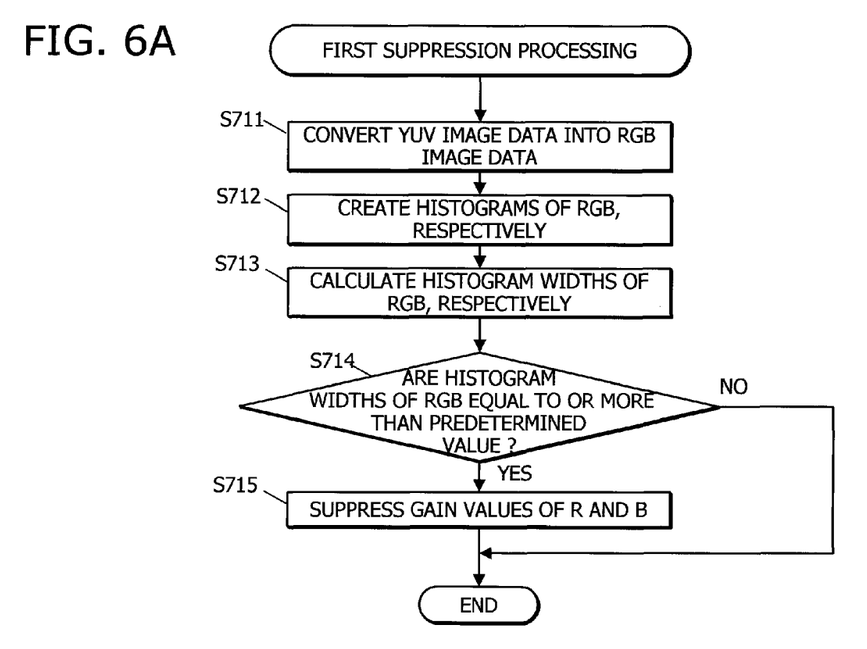
FIG. 6A is a flow chart showing an example of an operation in a first suppression processing in the gain value suppression processing in FIG. 5.

As shown in FIG. 6A, the photographing environment information obtaining section 41 first converts the YUV image data of the reduced image into RGB image data (Step S711), and then, creates the histograms of each of the RGB color components of the reduced image (Step S712).

Next, the photographing environment judging section 42 calculates the histogram widths of each of the RGB color components obtained by the photographing environment information obtaining section 41 (Step S713), and judges whether the histogram widths are equal to or more than the predetermined value (Step S714).

Figure 7A:
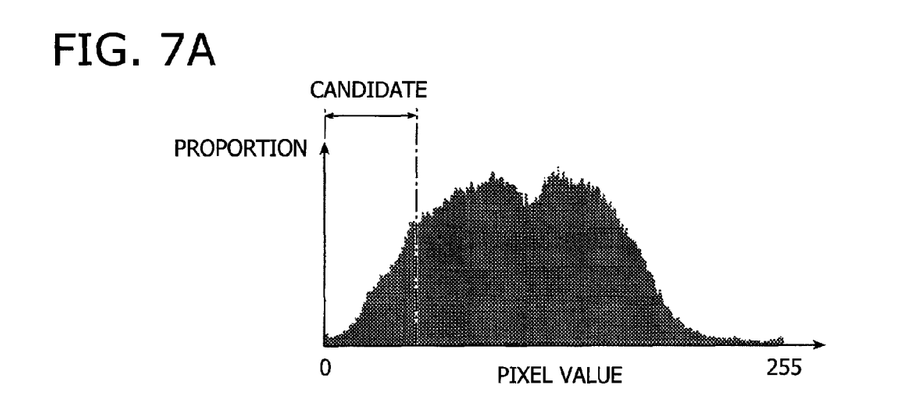
FIG. 7A is a diagram schematically showing an example of a histogram of saturation in the image correction processing in FIG. 2.
Figure 7B:
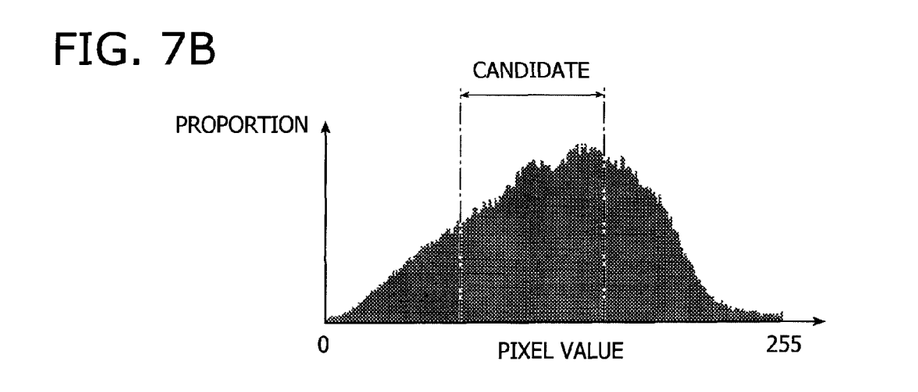
FIG. 7B is a diagram schematically showing an example of a histogram of brightness in the image correction processing in FIG. 2.
Figure 7C:
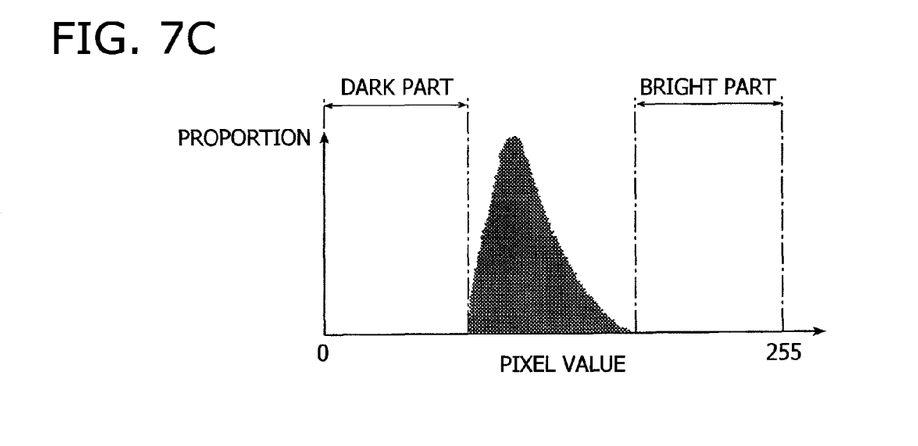
FIG. 7C is a diagram schematically showing an example of a histogram of RGB in the image correction processing in FIG. 2.

In the case of photographing underwater, for example, as shown in FIG. 7C, the photographing environment information obtaining section 41 creates a histogram. The histogram has the following characteristics.

First, no pixels in the histogram are arranged in a dark part region including the pixels within a predetermined range (a predetermined proportion of the total number of the pixels in the reduced image) from the pixel having the minimum pixel value (luminance value).

Second, no pixels in the histogram are arranged in a bright part region including the pixels within a predetermined range (a predetermined proportion of the total number of the pixels in the reduced image) from the pixel having the maximum pixel value.

Third, pixels in the histogram are arranged only in the central region where the difference between the dark part and the bright part is small.

In other words, the photographing environment information obtaining section 41 creates a histogram, where the range of the pixel values is narrow. On the other hand, in the case of photographing on land, for example, the photographing environment information obtaining section 41 creates a histogram where pixels are arranged not only in the central region but also in the dark part region and the bright part region. In other words, the photographing environment information obtaining section 41 creates a histogram, where the range of the pixel values is wide, although not shown in the figures.

In other words, the photographing environment judging section 42 judges whether the actual surrounding photographing environment and the photographing environment corresponding to the photographing mode (for example, "an underwater photographing mode") designated by a user beforehand at the time of imaging, i.e., the photographing environment to which the gain adjustment section 31 is to adjust a gain value, are different from each other, according to whether the histogram width is equal to or more than the predetermined value.

Then, when the photographing environment judging section 42 judges that the histogram width is equal to or more than the predetermined value at Step S714 (Step S714; YES), the actual surrounding photographing environment is "on land", for example, which is different from the photographing environment to which the gain adjustment section 31 is to adjust a gain value ("underwater", for example). Accordingly, the gain re-adjustment section 32 re-adjusts the gain value of the R component and/or the gain value of the B component, having been adjusted by the gain adjustment section 31, to be suppressed (Step S715), and then, ends the first suppression processing.

On the other hand, when the photographing environment judging section 42 judges that the histogram width is less than the predetermined value at Step S714 (Step S714; NO), the actual surrounding photographing environment ("underwater", for example) is the same as the photographing environment to which the gain adjustment section 31 is to adjust a gain value. Accordingly, the gain re-adjustment section 32 does not re-adjust the gain value of the R component and the gain value of the B component, and ends the first suppression processing.

Next, the second suppression processing at Step S72 will be described in detail with reference to FIG. 6B.

Figure 6B:
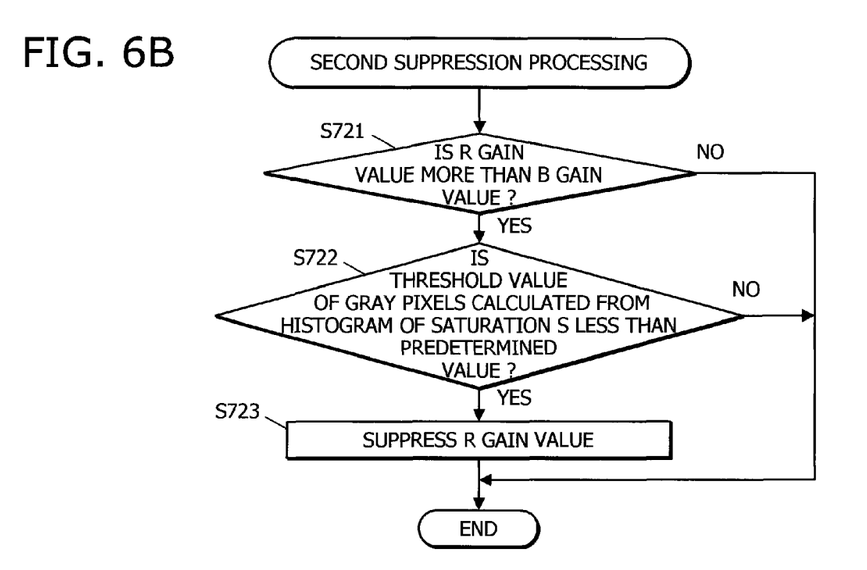
FIG. 6B is a flow chart showing an example of an operation in a second suppression processing in the gain value suppression processing in FIG. 5.

As shown in FIG. 6B, the saturation intensity distribution judgment section 44 judges whether the gain value of the R component adjusted by the gain adjustment section 31 is more than the gain value of the B component (Step S721).

When the saturation intensity distribution judgment section 44 judges that the gain value of the R component is more than the gain value of the B component at Step S721 (Step S721; YES), the saturation intensity distribution obtaining section 43 obtains the histogram of saturation S in HSV color space of the reduced image generated by the gain adjustment section 31. And after that, the saturation intensity distribution judgment section 44 identifies a threshold value of the gray pixels based on the histogram of the saturation S. Concretely, the saturation intensity distribution judgment section 44 identifies the maximum pixel value in the gray region, including the pixels within a predetermined range (a predetermined proportion of the total number of the pixels in the reduced image) from the pixel having the minimum pixel value, as a threshold value. And then, the saturation intensity distribution judgment section 44 judges whether the threshold value of the gray pixels is less than the predetermined value (Step S722).

In other words, in the image, the saturation S of which ranges widely enough, for example, the threshold value of the gray pixels is less than the predetermined value because the histogram, where a pixel is arranged in the region of a smaller pixel value, is created. On the other hand, in the image, the saturation S of which does not range widely enough, for example, the threshold value of the gray pixels is equal to or more than the predetermined value because the histogram, where a pixel is not arranged in the region of a smaller pixel value, is created.

Then, when the saturation intensity distribution judgment section 44 judges that the threshold value of the gray pixels is less than the predetermined value at Step S722 (Step S722; YES), the saturation S of the image ranges widely enough, and therefore, the gain re-adjustment section 32 re-adjusts the gain value of the R component, having been adjusted by the gain adjustment section 31, to be more strongly suppressed than the gain value of the B component (Step S723), and ends the second suppression processing.

On the other hand, when the saturation intensity distribution judgment section 44 judges that the threshold value of the gray pixels is equal to or more than the predetermined value at Step S722 (Step S722; NO), the saturation S of the image does not range widely enough, and therefore, the gain re-adjustment section 32 ends the second suppression processing without re-adjusting the gain values of the R component and the B component.

Further, when the saturation intensity distribution judgment section 44 judges that the gain value of the R component is not more than the gain value of the B component at Step S721 (Step S721; NO), the second suppression processing also ends.

As described above, according to the imaging apparatus 100 of the present embodiment, when gain values of R components and gain values of B components of an image are adjusted corresponding to a predetermined photographing environment (for example, "underwater"), and after that, an image is taken in a photographing environment other than the predetermined photographing environment (for example, "on land"), it is judged that the photographing environment of the image and the photographing environment to which a gain value is to be adjusted are different from each other. Then, the imaging apparatus 100 automatically re-adjusts the gain values of the R component and/or the B component, which have been adjusted, to be suppressed, and records the image obtained by performing a color adjustment by using the re-adjusted gain values.

Therefore, the imaging apparatus 100 enables generating and recording an image with natural color shades even under the other photographing environment, by re-adjusting the gain values to the proper values to correspond to the other photographing environment after the change of the photographing environment.

Concretely, even if the photographing mode is set to "an underwater photographing mode" which enables a proper photographing underwater, the actual surrounding photographing environment has been changed from "underwater" to "on land," for example, when the histograms of each of the RGB color components of the image have a width equal to or more than the predetermined value, respectively. In that case, it is judged that the actual surrounding photographing environment is different from the photographing environment to which a gain value is to be adjusted (for example, "underwater" corresponding to the "underwater photographing mode"), and the gain values of the R component and/or the B component, which have been adjusted, are re-adjusted automatically to be suppressed. Thereby, when the photographing environment is changed (for example, from "underwater" to "on land"), the imaging apparatus 100 enables automatically changing the gain values to correspond to the other photographing environment after the change of the photographing environment, even if a user forgets to change the photographing mode. Therefore, the imaging apparatus 100 enables generating an image with natural color shades even under the other photographing environment.

Moreover, the imaging apparatus 100 judges whether the gray value (the threshold value of the gray pixels) in the histogram of saturation S in the HSV color space is less than the predetermined value, when the gain value of the R component adjusted by the gain adjustment section 31 is more than the gain value of the B component. When it is judged that the gray value is less than the predetermined value, the imaging apparatus 100 re-adjusts the gain value of the R component, which has been adjusted, to be more strongly suppressed than the gain value of the B component. Thereby, the imaging apparatus 100 re-adjusts the gain values to the proper values to correspond to the other photographing environment after the change of the photographing environment, and enables generating an image with natural color shades even under the other photographing environment.

Furthermore, the present invention is not limited to the embodiment described above, and various improvements and design changes can be performed without departing from the spirit and the scope of the present invention.

For example, in the embodiment described above, the gain value of the R component, which has been adjusted, is re-adjusted to be more strongly suppressed than the gain value of the B component, when the gain value of the R component adjusted by the gain adjustment section 31 is more than the gain value of the B component, and when the gray value (the threshold value of the gray pixels) in the histogram of saturation S in the HSV color space is less than the predetermined value. However, the gain value of the R component, which has been adjusted, may be re-adjusted to be more strongly suppressed than the gain value of the B component, every time the gain value of the R component adjusted by the gain adjustment section 31 is more than the gain value of the B component.

Moreover, in the embodiment described above, both of the first suppression processing and the second suppression processing are performed in the gain value suppression processing. However, the imaging apparatus 100 can be configured to perform at least the first suppression processing, and therefore, the second suppression processing does not have to be performed necessarily.

Further, in the embodiment described above, the difference between the actual surrounding photographing environment and the photographing environment to which a gain value is to be adjusted is judged based on the histogram widths of each of the RGB color components of a reduced image, but the configuration is not limited to this. For example, a hydraulic pressure sensor and a moisture detection sensor and the like can be loaded, and whether the photographing environment has been changed can be judged according to the result of the detection by the sensors.

Moreover, the configuration illustrated in the embodiment described above is an example, and the configuration of the imaging apparatus 100 is not limited to the above embodiment.

In addition, the embodiment described above is configured so that the functions as a gain adjustment section, an information obtaining section, a first judgment section, a gain re-adjustment section and an image recording section are realized by the drives of the gain adjustment section 31, the photographing environment information obtaining section 41, the photographing environment judging section 42, the gain re-adjustment section 32 and the image recording section 9, under the control of the central control section 11, but the configuration is not limited to this. For example, those functions may be realized by the execution of a predetermined program and the like by the CPU of the central control section 11.

That is to say, the program including a gain adjustment processing routine, an information obtaining processing routine, a first judgment processing routine, a gain re-adjustment processing routine, and an image recording processing routine, may be stored in a program memory (not shown) to store the program. Then, the gain adjustment processing routine may make the CPU of the central control section 11 function as a gain adjustment section to adjust a gain value of an R component and/or a gain value of a B component so that an average value of R components and an average value of B components match an average value of G components, respectively, among color components of a pixel in a gray region included in a color image imaged by the imaging section 2. Further, the information obtaining processing routine may make the CPU of the central control section 11 function as an information obtaining section to obtain information about a photographing environment of the image after the adjustment by the gain adjustment section. Further, the first judgment processing routine may make the CPU of the central control section 11 function as a first judgment section to judge whether a first photographing environment in the information obtained by the information obtaining section, and a second photographing environment to which the gain adjustment section is to adjust a gain value, are different from each other. Further, the gain re-adjustment processing routine may make the CPU of the central control section 11 function as a gain re-adjustment section to re-adjust at least one of the gain value of the R component and the gain value of the B component, each having been adjusted by the gain adjustment section, to be suppressed, when the first judgment section judges that the first photographing environment and the second photographing environment are different from each other. Further, the image recording processing routine may make the CPU of the central control section 11 function as an image recording section to record an image obtained by performing a color adjustment by using a gain value re-adjusted by the gain re-adjustment section.

The entire disclosure of Japanese Patent Application No. 2009-261782 filed on Nov. 17, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An imaging apparatus, comprising:
an imaging section;
a gain adjustment section to adjust a gain value of an R component or a gain value of a B component so that an average value of R components and an average value of B components match an average value of G components, respectively, among color components of pixels in a gray region included in an image imaged by the imaging section;
an information obtaining section to obtain information about a luminance distribution of each of the color components of the image after an adjustment by the gain adjustment section;
a first judgment section to judge whether at least one of a luminance distribution of the R component and a luminance distribution of the B component has a width that is equal to or more than a predetermined value among luminance distributions of the respective color components in the information obtained by the information obtaining section;
a gain re-adjustment section to re-adjust at least one of the gain value of the R component and the gain value of the B component, having been adjusted by the gain adjustment section, to be suppressed, when the first judgment section judges that at least one of the luminance distribution of the R component and the luminance distribution of the B component has a width that is equal to or more than the predetermined value; and an image recording section to record an image imaged by the imaging section and obtained by performing a color adjustment by using a gain value re-adjusted by the gain re-adjustment section.

2. The imaging apparatus according to claim 1, further comprising:
an intensity distribution obtaining section to obtain an intensity distribution of a saturation of the image imaged by the imaging section; and
a second judgment section to judge whether a gray value in the intensity distribution obtained by the intensity distribution obtaining section is less than a predetermined value,
wherein the gain re-adjustment section re-adjusts the gain value of the R component, having been adjusted by the gain adjustment section, to be more strongly suppressed than the gain value of the B component when the second judgment section judges that the gray value is less than the predetermined value.

3. The imaging apparatus according to claim 1, wherein the gain re-adjustment section re-adjusts the gain value of the R component to be more strongly suppressed than the gain value of the B component when the gain value of the R component adjusted by the gain adjustment section is more than the gain value of the B component.

4. The imaging apparatus according to claim 1, wherein a gain value of each of the color components to be adjusted by the gain adjustment section is a gain value which is to be adjusted when the image is imaged underwater.

5. An imaging processing method using an imaging apparatus including an imaging section, the method comprising:
adjusting a gain value of an R component or a gain value of a B component so that an average value of R components and an average value of B components match an average value of G components, respectively, among color components of pixels in a gray region included in an image imaged by the imaging section;
obtaining information about a luminance distribution of each of the color components of the image after an adjustment of the gain value of the R component or the gain value of the B component;
judging whether at least one of a luminance distribution of the R component and a luminance distribution of the B component has a width that is equal to or more than a predetermined value among luminance distributions of the respective color components in the obtained information;

re-adjusting at least one of the gain value of the R component and the gain value of the B component, having been adjusted, to be suppressed, when it is judged that at least one of the luminance distribution of the R component and the luminance distribution of the B component has a width that is equal to or more than the predetermined value; and
recording an image imaged by the imaging section and obtained by performing a color adjustment by using a re-adjusted gain value.

6. A non-transitory recording medium readable by a computer of an imaging apparatus including an imaging section, recording a program that is executable to control the computer to function as elements comprising:
a gain adjustment section to adjust a gain value of an R component or a gain value of a B component so that an average value of R components and an average value of B components match an average value of G components, respectively, among color components of pixels in a gray region included in a color image imaged by the imaging section;
an information obtaining section to obtain information about a luminance distribution of each of the color components of the image after an adjustment by the gain adjustment section;
a first judgment section to judge whether at least one of a luminance distribution of the R component and a luminance distribution of the B component has a width that is equal to or more than a predetermined value among luminance distributions of the respective color components in the information obtained by the information obtaining section;
a gain re-adjustment section to re-adjust at least one of the gain value of the R component and the gain value of the B component, having been adjusted by the gain adjustment section, to be suppressed, when the first judgment section judges that at least one of the luminance distribution of the R component and the luminance distribution of the B component has a width that is equal to or more than the predetermined value; and
an image recording section to record an image imaged by the imaging section obtained by performing a color adjustment by using a gain value re-adjusted by the gain re-adjustment section.

* * * * *